Jan. 17, 1956 G. HENSEL 2,731,006
ADAPTERS FOR INTERNAL-COMBUSTION ENGINES
Filed Oct. 25, 1954
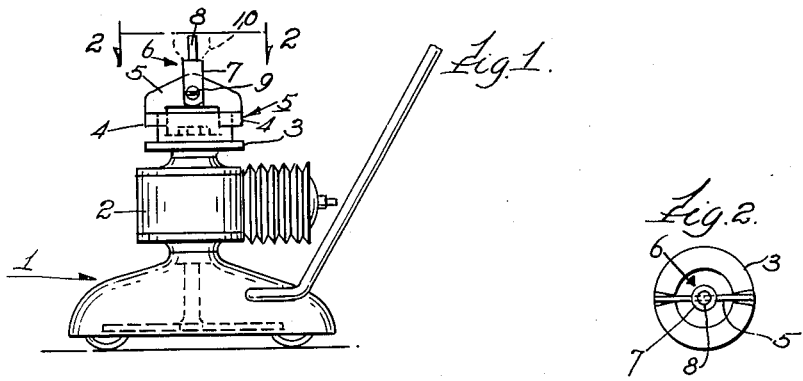
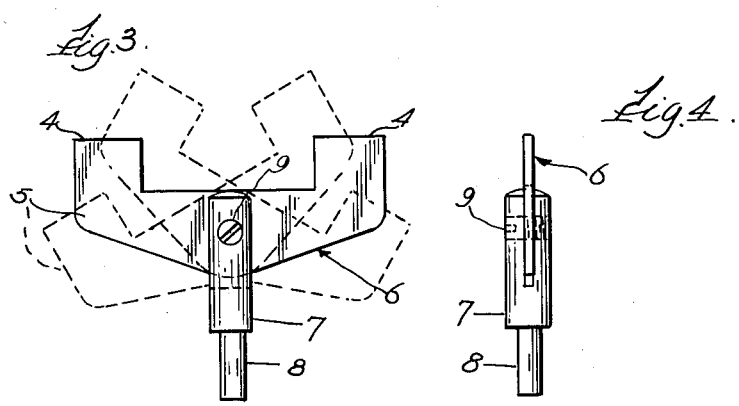
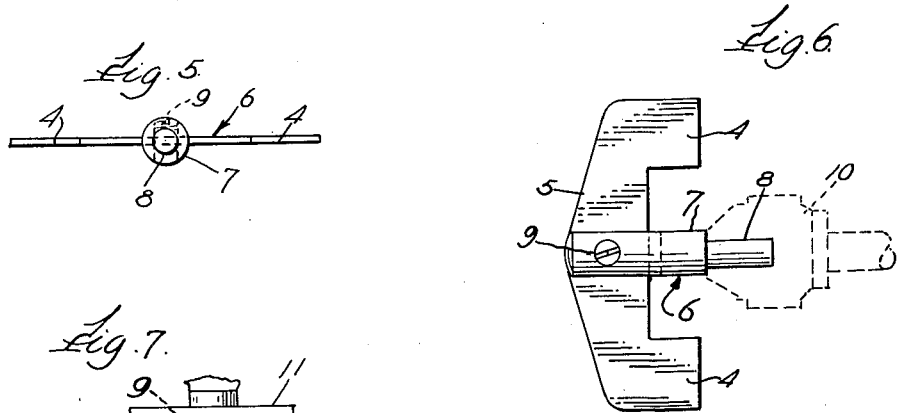
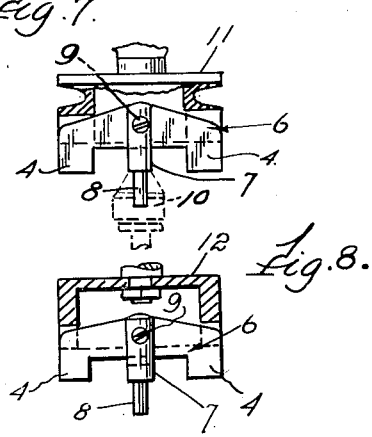
INVENTOR.
Gustav Hensel.
BY
H. J. Sanders
Attorney.

United States Patent Office 2,731,006
Patented Jan. 17, 1956

2,731,006

ADAPTERS FOR INTERNAL-COMBUSTION ENGINES

Gustav Hensel, Hillside, Ill.

Application October 25, 1954, Serial No. 464,359

1 Claim. (Cl. 123—179)

This invention relates to an adapter for transmitting power from a rotary member to use in energizing inertia starters for internal combustion engines. One object is to provide such an adapter of very simple structure that may be carried in the hand, or in the pocket, ready for instant use, as an example, to start the motor of a lawn mower or other small motorized device or machine by connecting it temporarily to the chuck of an electric tool or machine, and starting same.

A further object is to provide such an adapter that may be employed to start motors having motor shaft pulleys or rope drums to which the adapter may be applied. A still further object is to provide a very simple adapter sufficiently flexible in structure to provide means permitting the energizing of the starter even though the shaft of same and the shaft to which it is applied may be out of line.

A further object is to provide an adapter having a reversible part to permit its application to machines of somewhat different structures. Another object is to provide an adapter that is very inexpensive to manufacture, that may be handled with safety to the operator, that consists of but two parts and that is efficient in operation.

Other objects of my invention will become apparent from the following description taken in connection with the accompanying drawing, in which:

Fig. 1 is a view in elevation of a motor driven machine showing the application of the instant device for starting the motor.

Fig. 2 is a top plan view of Fig. 1 on the line 2—2 thereof.

Fig. 3 is a view of the adapter per se, showing in dotted lines altered positions of an adjustable part.

Fig. 4 is an edge view of Fig. 3.

Fig. 5 is a top plan view of Fig. 1.

Fig. 6 is a view of the adapter with one element transposed to facilitate application to the chuck of a machine.

Fig. 7 is a view partly in section showing the application of the adapter to the shaft pulley of a machine, and, Fig. 8 is a similar view showing the application to the shaft drum of a machine.

The reference numeral 1 denotes a mower or like machine having the motor 2 the shaft of which is provided with the starter pulley 3 having conventional grooves or notches that may be engaged by the parallel terminals 4, 4 of the head 5 of the inverted T-shape adapter, the stem 6 of the adapter having the large bifurcate portion 7 and the diminished portion 8, said portion secured by the screw or pin 9 to the head 5.

The adapter of the inverted T-shape is shown in Figs. 1 through 5 and here the smaller portion 8 of the stem is inserted in a small chuck 10, Fig. 1 to transmit power therefrom through the adapter to the pulley 3 to start the machine motor 2; a larger chuck 10 will engage the larger portion 7 of said stem.

Referring now to Figs. 6 through 8 the adapter head 5 has been reversed so that the terminals 4, 4 are adjacent the stem diminished portion 8 while in the inverted T-shape type of adapter said terminals are remote from said stem portion 8. Here the stem portion 8 is received in and driven by the chuck but the body portion of the head 5, as distinguished from the terminals thereof, engage the pulley 11, or drum 12, Figs. 7 and 8 respectively.

The thickness of the head 5 is somewhat less than the width of the space between the bifurcate portions of the stem portion 7 so that a limited lateral movement or play of the head in said stem is provided and an oscillating of said head in the plane thereof is possible, the extent or range of this movement being determined by the depth of the split or incision in the stem portion 7, the base of this incision serving as an abutment for the head 5 in its oscillating movements. This structure permits more freedom in positions of the chuck, pulley or drum and provides a centering means to align the axes of drive shaft and driven shaft to facilitate the starting operation. It will be noted also that the terminals 4, 4 of the head 5 are of less thickness than the width of the grooves or notches in the pulley or drum thus permitting a lateral movement of the head, to a degree, while engaged with the pulley or drum.

What is claimed is:

An adapter for engagement with a member to be rotated comprising: a reversible T-shape head for application, in one position, to the starter pulley of an engine shaft and for application in a second position to the starter drum of an engine shaft; a stem having a large portion and a diminished portion, the large stem portion being bifurcated and receiving said T-shape head, the width of the space between the bifurcated portions of said stem being materially greater than the thickness of said head at their point of juncture affording a limited movement of said head, and a pin pivotally connecting said head to stem supporting said head wholly above the base of said stem bifurcation in one position of said head and permitting oscillating movement of said head in the plane of said stem to provide centering means for aligning the axes of drive shaft and driven shaft to facilitate the starting operation, the diminished portion of said stem adapted to be received in the chuck of a machine.

References Cited in the file of this patent

UNITED STATES PATENTS

| | | |
|---|---|---|
| 1,000,553 | Recconi | Aug. 15, 1911 |
| 1,612,524 | Monohan | Dec. 28, 1926 |
| 1,867,484 | Wolfe et al. | July 12, 1932 |